No. 766,099. PATENTED JULY 26, 1904.
J. W. BUSSELL.
MACHINE FOR REMOVING INSECTS FROM PLANTS OR THE LIKE.
APPLICATION FILED MAR. 27, 1903.
NO MODEL.
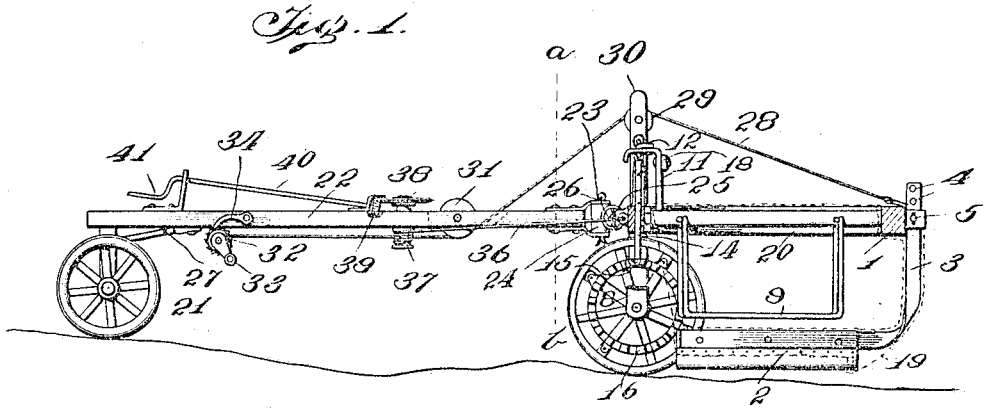
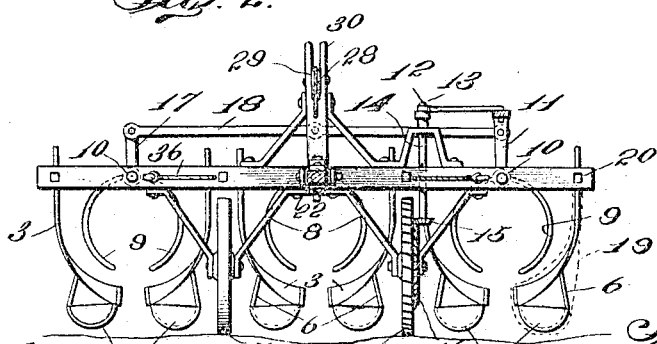
Witnesses
L. Gosford Hardy
W. T. Jones
Inventor
J. W. Bussell
By Fred Beall
Attorney No. 766,099. Patented July 26, 1904.

UNITED STATES PATENT OFFICE.

JAMES W. BUSSELL, OF MIDLOTHIAN, TEXAS.

MACHINE FOR REMOVING INSECTS FROM PLANTS OR THE LIKE.

SPECIFICATION forming part of Letters Patent No. 766,099, dated July 26, 1904.

Application filed March 27, 1903. Serial No. 149,905. (No model.)

*To all whom it may concern:*

Be it known that I, JAMES W. BUSSELL, a citizen of the United States, residing at Midlothian, in the county of Ellis and State of Texas, have invented certain new and useful Improvements in Machines for Removing Insects from Plants or the Like, of which the following is a specification.

This invention relates to machines for removing insects from plants, and is particularly adapted for the removal of weevils from plants, especially cotton-plants.

It consists in a mechanism comprising a frame carrying catching-receptacles and beaters for beating the bushes or plants and knocking weevils or other insects into the receptacles.

It also consists in a machine for removing insects from plants comprising a frame, a series of troughs suspended therefrom, beaters arranged above the troughs, and means for causing the vibration of the beaters when the machine is propelled.

It further consists in a machine provided with a frame mounted on suitable wheels and provided with pairs of troughs, the troughs being made to travel on each side of plants, beaters for engaging the plants and knocking the insects from same into the troughs, means for vibrating the beaters when the machine moves along by the plants, and means for guiding the machine so as to closely follow lines or rows of plants to be operated upon.

It also consists in certain other novel constructions, combinations, and arrangements of parts, as will be hereinafter fully described and claimed.

In the accompanying drawings, Figure 1 is a side elevation of my improved mechanism for removing insects from plants and the like. Fig. 2 is a vertical cross-section through the same on the line *a b* of Fig. 1. Fig. 3 is a top plan view of the machine. Fig. 4 is a perspective view of one of the beaters.

As is well known, various insects, such as weevils and the like, are very destructive to certain plants and crops, and especially has the weevil become destructive to cotton-plants in Texas and other parts of the country in late years. These insects have been removed from the plants by hand heretofore with a great deal of labor and time and still it is difficult to prevent much damage being done by these insects or beetles.

The present invention has for its object the provision of a machine which can be propelled or drawn through fields of various crops, the bushes or plants being received by the machine as it moves along and shaken or beaten, so as to knock weevils or other insects therefrom and collect the same. By this device a great area can be covered in a comparatively short time and the ravages of the insects can be effectually checked. I have illustrated in the accompanying drawings a mechanism embodying the features of my invention, in which a frame 1 is employed, which carries a series of troughs 2 suspended therefrom. The troughs are suspended by hangers 3, adjustably secured upon the front portion of the frame 1. The upper ends of the hangers 3 may be provided with a series of apertures, as 4, through which a bolt or pin 5 may be passed to secure them to a projection or clamp extending from the frame 1. The hangers are preferably curved rearwardly at the lower ends and are secured to the elongated troughs 2. The troughs are arranged in pairs, with their inner edges brought comparatively close together, but of sufficient width to receive the stalks or stems of plants or other vegetable growths. The supporting-hangers 3 are preferably spread apart a considerable distance at their upper ends, but draw inwardly to the inner edges of the troughs at their lower ends, as shown in Fig. 2, forming more or less elastic supports for the troughs. The troughs are thus mounted so that they may yield under stubborn resistance. The outer edges of the troughs at their front ends may, if desired, be braced with respect to the hangers 3 by means of braces 6, so as to hold them more securely attached to the hangers. The frame 1 of the machine is approximately rectangular in shape and carries, preferably, more than one pair of troughs, the device illustrated in the drawings showing three pairs of such troughs. In this manner three rows of plants can be operated upon simultaneously. The frame 1 is supported upon wheels 7, preferably two in number, which are held in position by brackets 8, secured to the under side of the frame 1 at its rear edge. The wheels are so spaced as to run between the rows of plants being operated upon. Mounted above the troughs and carried by the frame 1 are a series of beaters or agitators 9, comprising downwardly-extending curved loops of wire, which are secured at their upper ends to rock-shafts 10, journaled in the front and rear bars of the frame 1. The agitators are curved away from each other at their central portions, but draw together near their lower edges to about the same width as the space between the troughs of each pair or set. The plants will thus be received between the arms or such portions of the agitators or beaters 9. One of the shafts 10 is preferably made longer than the other and has secured to it an upwardly-projecting yoke 11, by which it may be rocked in its bearings in the frame. This yoke is connected by means of a pitman 12 with a crank 13, carried by the upper end of a shaft 14, journaled upon the frame 1. The shaft 14 is arranged in a vertical position and carries at its lower end a beveled gear 15, which meshes with a beveled gear 16 upon the side of one of the wheels 7. In this manner when the wheel 7 revolves the shaft 14 will be rotated and the crank 13 will impart a rocking movement to the shaft 10 through the pitman 12 and the yoke 11. The other shafts 10 of the machine are preferably made to rock simultaneously with the one carrying the yoke and are each provided with an upwardly-extending standard 17, which is connected, by means of a link or rod 18, with the yoke 11. In this manner when one of the rock-shafts 10 is moved the others will have a corresponding movement and all of the agitators will be operated for having a simultaneous action upon the plants passing between them.

While it is not essential that the troughs be provided with shields, yet I usually secure pieces of fabric, as 19, to the outer edges of the troughs, said fabrics extending upwardly to bars 20 of the frame 1 and also being secured at their forward edges to the hangers 3. Thus said fabrics insure the collection of all the weevils or insects knocked from the bushes by the agitators and direct them into the troughs.

The machine is preferably guided by means of a truck 21, extending to the rear of the frame 1 and connected therewith by a pole or reach 22. The pole or reach 22 is connected to the frame 1, preferably at its central portion, by a universal joint, as at 23. This is accomplished in a simple manner by employing a pivot-piece 24, having two pin-engaging apertures or bearings formed therein at right angles to each other. One of said apertures is engaged by a pin or bolt 25, passed through the same and through receiving-lugs secured to the frame 1. The other aperture, which is at right angles to the first aperture, is engaged by a bolt or cotter-pin 26, which passes through lugs or projections at the forward end of the reach 22 and through said aperture. In this manner the reach is free to rise and fall with respect to the frame 1 or move laterally. The truck-wheels are arranged beneath the rear end of the reach 22, and draft means of any kind may be attached to the truck—as, for instance, to a whiffletree 27 arranged just in front of the wheels.

It is found necessary at times to alter the elevation of the front edge of the frame 1, especially where the contour of the ground changes materially. For this purpose I secure a cable, as 28, in a suitable manner to the front bar of the frame 1 and pass the same over a guide-pulley 29, carried at the upper end of a bifurcated standard 30, mounted upon the edge of the frame 1. The cable 28 passes through an aperture in the reach 22 and beneath a guide-pulley 31, after which the cable extends to a windlass 32, secured upon the under surface of the reach 22 near the rear truck. This windlass is operated by the crank-handle 33 and is held against unwinding by a suitable pawl 34, engaging a ratchet 35 upon the drum of the windlass. In this way by the operation of the windlass the front edge of the frame 1 may be raised or lowered as required and held in such adjusted positions.

Since the team or other draft mechanism is applied to the rear truck of the machine, it is necessary to guide the frame 1, so that it shall properly meet the plants to be operated upon. I employ a simple means for effecting this purpose, which comprises cables 36, secured at their forward ends to the frame 1 near the opposite ends thereof, from which said cables extend to a vertical drum 37, mounted upon the under side of the reach 22. The shaft of the drum 37 projects upwardly through the reach 22 and carries a gear-wheel 38 at its upper end. The gear-wheel 38 is preferably a beveled gear and meshes with a beveled pinion 39, carried by a shaft 40, mounted upon the upper side of the reach 22. The shaft 40 extends rearwardly along the said reach, preferably in an inclined manner, and is provided with a crank-handle 41, by which it may be turned.

Of course it will be apparent that the team or other draft means may be applied to the mechanism at any other desired point; but it is preferable to have the beating portion of the apparatus approach the plants first, so that they will not be shaken and the insects knocked to the ground by a team or persons passing between the bushes or plants before the machine reaches them. I also contemplate varying the gearing employed for operating the mechanism without departing from the spirit of the invention.

Having thus fully described my invention, what I claim as new, and desire to secure by Letters Patent, is—

1. A machine for removing insects from plants, comprising a rock-shaft, beating-arms projecting outwardly from said shaft from the opposite sides thereof, and means for rocking the said shaft.

2. A machine for removing insects from plants, comprising a rock-shaft, and a plurality of oppositely-curved arms extending from the said rock-shaft so as to engage plants upon the opposite sides thereof, and means for rocking the said shaft to vibrate the beating-arms.

3. A machine for removing insects from plants, comprising a frame, a rock-shaft journaled therein, a plurality of curved arms secured to the rock-shaft at one end and extending downwardly upon opposite sides of the plants to be operated upon at their other ends, and means for rocking the said shaft.

4. A machine for removing insects from plants, comprising a plurality of rock-shafts, means for rocking the said shafts simultaneously, and a plurality of outwardly-curved beating-arms carried by each rock-shaft, the machine being capable of engaging a plurality of rows of plants at one time.

5. A machine for removing insects from plants, comprising a frame, rock-shafts mounted therein, oppositely-curved beating-arms extending from the opposite sides of each of said shafts, means for actuating the rock-shafts to vibrate the beating-arms, and means for propelling the machine from the rear so as not to knock the insects from the plants before they are gathered by the machine.

6. A machine for removing insects from plants, comprising a rock-shaft, oppositely-curved beating-arms extending from each side of the said rock-shaft so as to inclose a plant, a trough for each beating-arm suspended immediately below the said arm, and means for rocking the shaft.

7. A machine for removing insects from plants comprising a frame, troughs arranged beneath the same, beaters arranged above the troughs comprising rock-shafts and beating-arms carried by them, standards extending upwardly from the rock-shafts, means for connecting the standards for rocking all the shafts simultaneously, and means for imparting movement to one of said shafts for operating all of them, substantially as described.

8. A machine for removing insects from plants comprising a frame, a trough suspended therefrom, vibrating agitators arranged above the troughs comprising rock-shafts and agitator-arms carried thereby, a yoke secured to one of said shafts, means for connecting the other shafts with said yoke, a pitman for actuating said yoke, a crank for actuating the pitman and gearing connecting the crank with one of the wheels of the machine for imparting movement to it, substantially as described.

9. A machine for removing insects from plants, comprising a frame, a series of rock-shafts mounted therein, a plurality of beating-arms projecting from each rock-shaft, a trough for each beating-arm suspended immediately below the same, and means for rocking the shafts simultaneously.

10. A machine for removing insects from plants, comprising a frame, a plurality of rock-shafts mounted therein, each of the said rock-shafts having oppositely-curved beating-arms, troughs arranged immediately below the beating-arms, one trough being provided for each arm, and means extending downwardly from one end of the machine-frame for engaging and supporting the troughs at one end, together with means for rocking the rock-shafts.

11. A machine for removing insects from plants, comprising a rock-shaft mounted therein, a plurality of curved arms extending from the rock-shaft, each arm consisting of a wire having curved ends secured to the shaft, and a straight beating portion connecting said curved portions, and means for rocking the shaft.

In testimony whereof I have signed my name to this specification in presence of two witnesses.

JAMES W. BUSSELL.

Witnesses:
L. O. Moore,
Geo. P. Wilson.